James W. Hamner
Marvin E. Turner INVENTORS

BY

ATTORNEY

United States Patent Office 3,205,745
Patented Sept. 14, 1965

3,205,745
APPARATUS FOR CUTTING SLENDER
ALUMINUM TUBING
James W. Hammer, Huntsville, and Marvin E. Turner, Gurley, Ala., assignors to Thiokol Chemical Corporation, Bristol, Pa., a corporation of Delaware
Filed Apr. 6, 1964, Ser. No. 357,426
4 Claims. (Cl. 83—444)

This invention relates to an apparatus for cutting continuous slender aluminum tubing and is particularly directed to a precision cutting apparatus for cutting the aluminum tubing into short lengths that, when added to a solid propellant, will enhance the burning rate thereof.

There are numerous cutting devices for cutting material into various lengths; but such devices crimp the material at the cutting area and such crimping must be avoided in cutting the slender aluminum tubing if it is to achieve the desired result after it has been mixed with the solid propellant. The devices were also not capable of precise alignment of the cutters so that the material being cut was not always of uniform length because of the difficulty of feeding the material to the cutters. Variance in speed of the cutters, it is believed, caused the crimping of the cut ends of the material; and thus no suitable cutting apparatus had been found to be available for properly cutting the slender aluminum tubing.

It is an object of the invention, therefore, to provide a cutting apparatus that will precision cut the slender aluminum tubing into uniform lengths without crimping the tubing during the cutting operation.

It is another object of the invention to provide a cutting apparatus that will retain the slender aluminum tubing in parallel relation to each other so that each piece of tubing will have direct contact with the cutter.

The cutting apparatus embodying the instant invention was developed because of the ever-growing requirement for solid propellants that have increased propulsive performance. One way of accomplishing this requirement was the addition to the solid propellant of short lengths of aluminum tubing. It was ascertained, however, that to achieve the purpose occasioned by the addition of these short lengths to the solid propellant the opposite ends thereof should not be crimped when the tubing was cut into short lengths. The passageway or bore of the tubing must remain open throughout the entire length of the tubing or the advantage obtained by the use of such tubing would be lost. It was imperative, therefore, to produce a cutting apparatus that could cut the tubing in short lengths without crimping the opposite ends thereof.

The instant invention, therefore, provides such an apparatus; and it is believed that, with the above and other objects and advantages in view, there has been provided a construction embodying a novel arrangement and combination of parts that is more fully hereinafter described, claimed and illustrated in the accompanying drawings in which:

Figure 1:
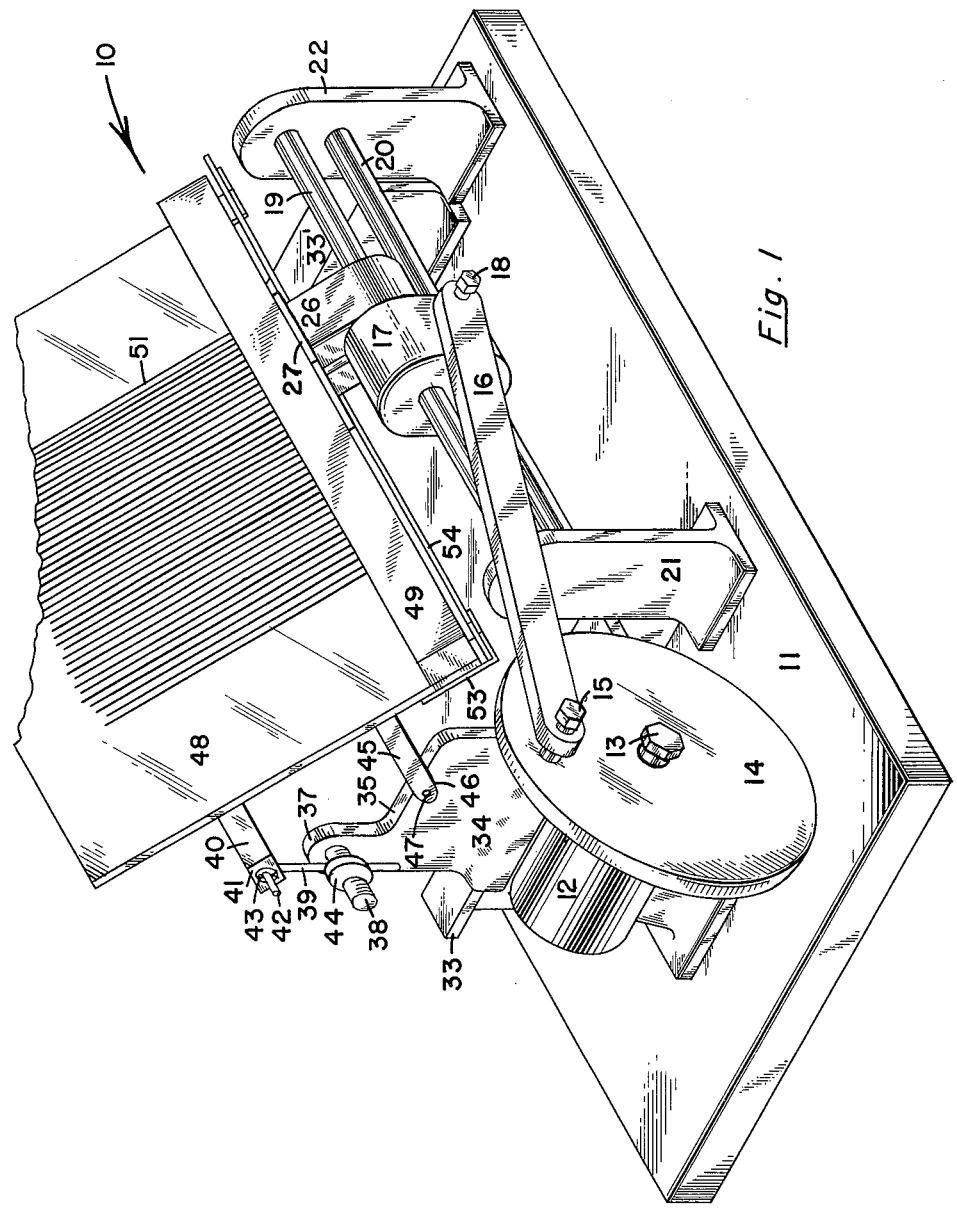
FIGURE 1 is a perspective view of a cutting apparatus embodying the invention.
Figure 2:
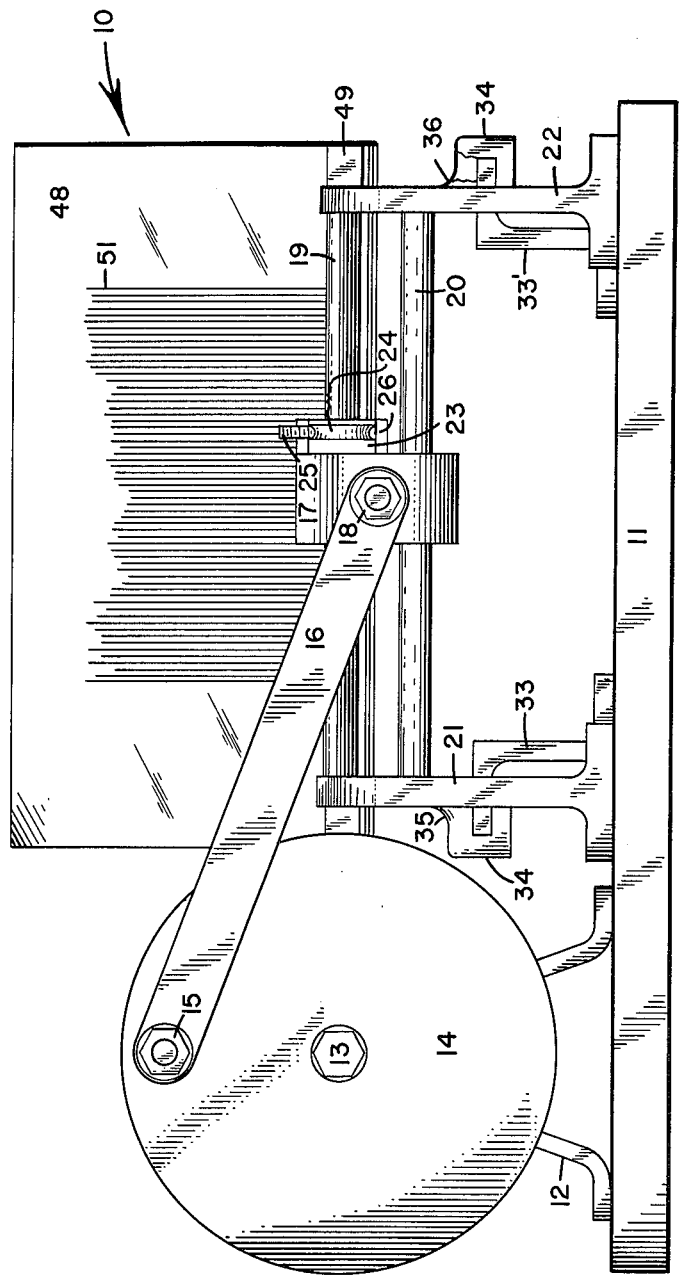
FIGURE 2 is a front elevational view of the apparatus of FIGURE 1.

Referring more in detail to the drawings wherein like parts are designated by like reference numerals, the reference numeral 10 is used to generally designate the cutting apparatus embodying the invention.

The cutting apparatus 10 includes a base support 11 which is of substantially rectangular formation and may be of any desired size depending upon the capacity of the cutting apparatus 10.

Mounted on the base 11 is a motor 12; and this motor may be an electric motor or an air motor with suitable reduction gearing cooperated therewith so that the rotational speed thereof may be governed as desired.

Detachably connected to the drive shaft of the motor 12 by means of a suitable fastening means 13 is a disc 14. The diameter of the disc 14 may also be varied according to the capacity of the cutting apparatus.

Eccentrically mounted in the disc 14 in spaced relation to the periphery thereof is a bolt shaft 15; and a connecting rod 16 is operatively connected at one end to the bolt shaft 15. The opposite end of the connecting rod 16 is operatively connected to a cross head 17 by means of a bolt shaft 18, and the cross head 17 is slidably mounted on a pair of spaced parallel guide bars 19 and 20 respectively.

The outer ends of the guide bars 19 and 20 are removably supported at their opposite outer ends by means of brackets 21 and 22 which are rigidly secured to the base 11 so that the bolt shafts 15 and 18 are in proper operational alignment with each other. Contiguous with the cross head 17 and also slidable on the guide bar 19 therewith is a stub shaft 23 that is provided with an annular groove 24. Keyed for pivotal movement to the stub shaft 23 by means of a set screw 25 is an arm 26, and rigidly secured to the free end of the arm 26 is a cutter blade mounting and retaining head 27. The head 27 is provided with spaced, internally-threaded bores to removably receive cutter blade retaining screws 28 which are loosely received in the parallel-spaced elongated slots 29 and 30 of the cutter blade 31. The cutter blade 31 is of substantially rectangular formation and is provided with a substantially V-shaped razor like cutting edge 32.

Mounted on the base 11 rearwardly of the brackets 21 and 22 are a pair of Z-shaped guide rails 33 and 33' respectively, and slidably mounted on one longitudinal edge of the guide rails 33 and 33' by means of a grooved base portion 34 are a pair of similarly-shaped support brackets 35 and 36 respectively. Each of the brackets 35 and 36 terminate in a short projection 37 in which is rigidly secured a slotted screw 38. The screw 38 receives a short rod 39 which is pivotally connected to a flat support bar 40 which extends between the support brackets 35 and 36. The bar 40 has an apertured L-shaped end 41 and the rod 39 has an L-shaped end 42 which extends outwardly of and through the apertured end 41 of the support bar 40; and a cotter key 43 retains the end 41 of the bar 40 on the short rod 39. A knurled circular nut 44 threadably mounted on the bolt 38 retains the short rod 39 in rigid adjusted relation to the projection 37 on the brackets 35 and 36, it being understood that each of the brackets 35 and 36 are of similar configuration and the various elements referred to are duplicated as to each of the brackets 35 and 36.

Extending from bracket 35 to bracket 36 is a flat mounting bar 45 that is provided with L-shaped ends 46 and each of the L-shaped ends 46 is pivotally connected to the brackets 35 and 36 by means of pivot pins 47.

A base board 48 is rigidly secured to the bar 45 and extending upwardly therefrom has sliding contact with the bar 40 against which it rests and is supported thereby. The lower end of the base board 48 has a right-angularly extending projection 49 thereon which is provided with a row of relatively-spaced apertures 50 through which a plurality of slender aluminum tubes 51 extend in parallel relation to each other. Adjustably mounted on the rear of the base board 48 by means of fastening means 52 are a pair of L-shaped brackets 53. A shelf 54 is secured to the brackets 53, and the lower ends of the slender aluminum tubes 51 contact and rest thereon.

Figure 3:
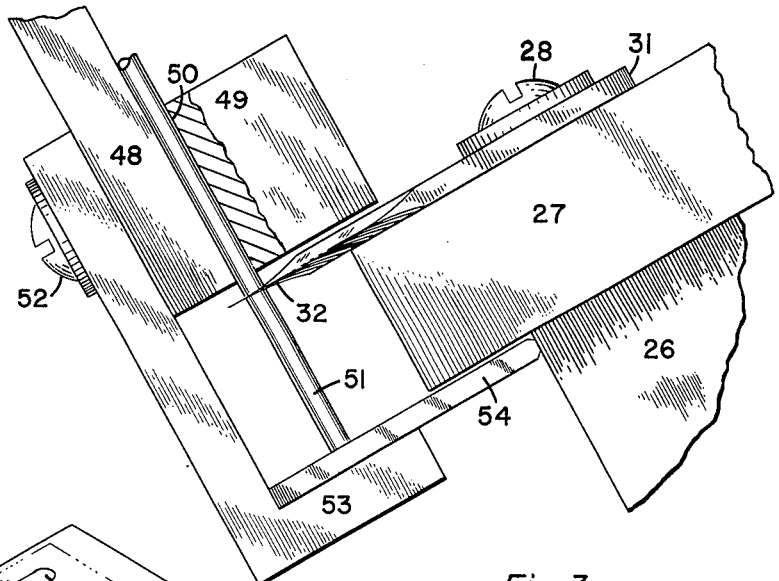
FIGURE 3 is an enlarged, detailed, fragmentary view showing the manner in which the cutter blade of the cutting apparatus addresses the slender aluminum tubing.
Figure 4:
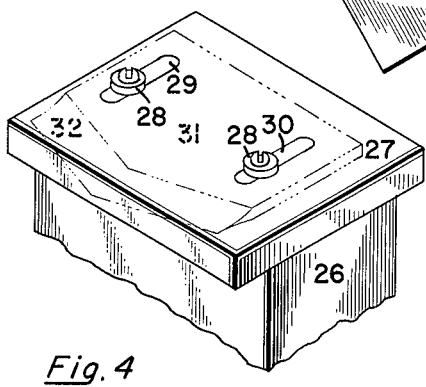
FIGURE 4 is a perspective view of a portion of the cutter blade mounting mechanism of the cutting apparatus.
Figure 5:
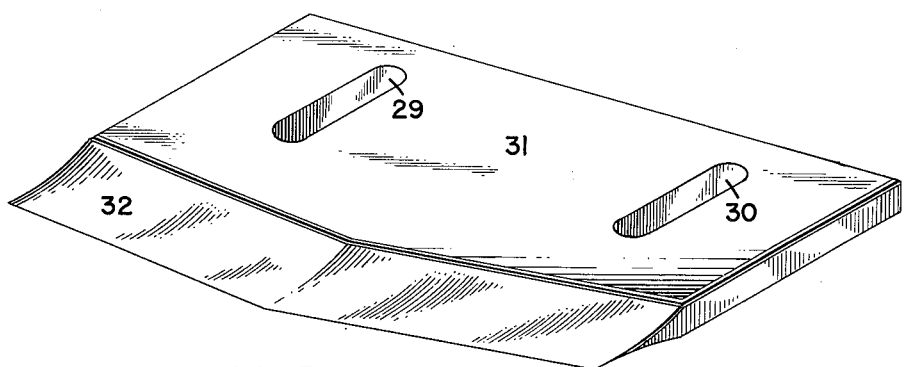
FIGURE 5 is an enlarged perspective view of the cutter blade of the cutting apparatus.

As shown in FIGURE 3, the arm 26 has sliding contact with the front longitudinal edge of the shelf 54 so that the cutter blade 31 is retained in the correct position during the cutting of the slender aluminum tubes 51.

In the operation of the cutting apparatus 10, the slender aluminum tubes 51 are placed upon the base board 48 and inserted into the apertures 50 in the projection 49 on the base board 48. When the ends of all of the slender aluminum tubes 51 are resting on the shelf 54, the motor 12 is started and the cutter blade 31 is reciprocated as previously described to cut the slender aluminum tubes 51. The cutter blade 31 creates a slicing action on the slender aluminum tubes 51 and this slicing action coupled with the relatively close tolerance that exists between the opposing surfaces of the cutter blade 31 and the projection 49 provides a clean cut in the slender aluminum tubes 51 without the crimping of the ends of the slender aluminum tubes 51 at the cutting area.

The slender aluminum tubes 51 will drop by gravity as the short lengths are cut therefrom; and a new supply can be added as the slender aluminum tubes 51 are fully cut. The short lengths will drop off of the shelf 54 and a receptacle may be placed on the base 11 to catch the short lengths being cut or a funnel or hopper having a suction hose connected thereto may be used to catch the short lengths as they are cut. Since either method for collecting the short lengths should be familiar to those skilled in the art, illustration thereof has not been included in the drawings.

The speed of the motor 12 may be governed to assure clean cuts of the slender aluminum tubing 51; and with the cutting apparatus 10 adjusted to cut the short lengths to predetermined measurements, a precision cutting apparatus has been provided that will cut the short lengths without crimping the opposite ends thereof.

It is also believed that the manner of operation and the construction of the cutting apparatus will be clear to those skilled in the art, and it is to be understood that variations in the mode of construction thereof may be adhered to providing such variations fall within the spirit of the invention and the scope of the appended claims.

Having thus described the invention, what is claimed as new and desired to be secured by Letters Patent is:

1. A precision cutting apparatus for cutting a plurality of slender aluminum tubing that are positioned in a plane at right angles to a cutter blade comprising a horizontally disposed rectangular shaped flat base, a power means mounted on the base adjacent one end thereof, a disc operatively connected to said power means, a shaft eccentrically mounted in said disc, a connecting rod connected to said shaft, a cross head having a pair of spaced openings therein connected to said connecting rod, a cutter blade retaining means connected to said cross head, a cutter blade adjustably mounted on said last said means, a pair of spaced parallel guide bars extending through the openings in said cross head for mounting said cross head and said blade retaining means for reciprocal movement in relation to a base board mounted on said base in a plane at right angles to said cutting blade, a shelf mounted on the lower edge of said base board at right angles thereto, a projection having a plurality of relatively spaced openings therein extending from said base board at right angles thereto above and in spaced parallel relation to said shelf and retaining in said openings a plurality of slender aluminum tubing, the lower ends of said tubing resting on said shelf in the path of said cutter blade so that the reciprocal movement of said cutter blade will cause the slender aluminum tubing to be cut into predetermined lengths without the crimping of the slender aluminum tubing at the cutting areas thereof.

2. A precision cutting apparatus as in claim 1 wherein a pair of L-shaped brackets are mounted on said base board and connected to said shelf for adjustably positioning said shelf so that the ends of the slender aluminum tubing resting on said shelf may be adjusted in relation to the cutter blade whereby the lengths of the slender aluminum tubing to be cut are determined.

3. A precision cutting apparatus as in claim 1 wherein a pair of Z-shaped guide rails are mounted on said base, a pair of support brackets are slidably mounted on said Z-shaped guide rails, a mounting bar is connected at its opposite ends to said support brackets, and to said base board and a supporting bar is adjustably connected to said support brackets and engages the rear of said base board for adjusting said base board to properly address the ends of the slender aluminum tubing to said cutter blade, and said cutter blade is of substantially V-shaped formation so that two cuts are made in the ends of said slender aluminum tubing during one rotation of said disc.

4. A precision cutting apparatus as in claim 1 wherein a stub shaft having an annular groove thereon extends outwardly from one end of said crosshead, an arm is mounted on said stub shaft and is provided with a set screw therein that is receivable in the groove in said stub shaft, and said arm is integral with said cutter blade retaining means so that said blade retaining means can be adjusted to properly address said cutter blade to the ends of said slender aluminum tubing.

References Cited by the Examiner

UNITED STATES PATENTS

| | | | |
|---|---|---|---|
| 1,925,791 | 9/33 | Conti | 83—578 X |
| 2,151,377 | 3/39 | Economakis | 83—165 |
| 2,209,412 | 6/40 | Lupo | 83—628 X |
| 2,304,926 | 12/42 | Juvinall | 225—2 |
| 2,489,921 | 11/49 | Moore | 83—578 X |
| 2,746,125 | 5/56 | Cuny | 83—581 X |
| 2,753,938 | 7/56 | Thiess | 83—614 X |
| 3,100,412 | 8/63 | Myotte | 83—163 |

FOREIGN PATENTS

| | | |
|---|---|---|
| 551,209 | 5/32 | Germany. |
| 604,494 | 7/48 | Great Britain. |

WILLIAM W. DYER, JR., *Primary Examiner.*

UNITED STATES PATENT OFFICE
CERTIFICATE OF CORRECTION

Patent No. 3,205,745                              September 14, 1965

James W. Hamner et al

It is hereby certified that error appears in the above numbered patent requiring correction and that the said Letters Patent should read as corrected below.

In the grant, line 1, and in the heading to the printed specification, line 4, for "James W Hammer", each occurrence, read -- James W. Hamner --; in the heading to the three sheets of drawings, line 1, for "J W. HAMMER ET AL", each occurrence, read -- J. W HAMNER ET AL --.

Signed and sealed this 12th day of April 1966.

(SEAL)
Attest:

ERNEST W. SWIDER
Attesting Officer

EDWARD J. BRENNER
Commissioner of Patents